United States Patent [19]

Dayen et al.

[11] Patent Number: 4,872,535
[45] Date of Patent: Oct. 10, 1989

[54] BRAKE

[75] Inventors: Leonid Dayen, Plymouth; Charles D. Raines, Blaine, both of Minn.

[73] Assignee: Horton Manufacturing Co., Inc., Minneapolis, Minn.

[21] Appl. No.: 252,183

[22] Filed: Sep. 30, 1988

[51] Int. Cl.⁴ ............................................. F16D 65/24
[52] U.S. Cl. .................................. 188/170; 188/72.3; 188/73.46; 303/71
[58] Field of Search ...................... 188/170, 72.3, 72.4, 188/18 A, 18 R, 73.44, 73.46, 71.5, 72.1, 72.5, 265, 264 A, 264 A A; 192/91 A, 91 R, 70.27, 70.22; 303/71, 9.76; 92/63, 29

[56] References Cited

U.S. PATENT DOCUMENTS

| | | |
|---|---|---|
| 2,258,784 | 10/1941 | McNeal . |
| 2,342,750 | 2/1944 | Newell . |
| 2,698,676 | 1/1955 | Eason . |
| 3,441,110 | 4/1969 | Ruggen ................................. 188/170 |
| 3,500,970 | 3/1970 | Schilling . |
| 3,599,760 | 8/1971 | Moss . |
| 3,688,877 | 9/1972 | Day . |
| 3,697,049 | 10/1972 | Wallace . |
| 3,863,038 | 1/1975 | Kreitner et al. . |
| 3,946,838 | 3/1976 | Daniels, Sr. . |
| 3,974,896 | 8/1976 | Rach . |
| 4,078,637 | 3/1978 | Hanks . |
| 4,128,145 | 12/1978 | Euler .................................. 188/170 X |
| 4,245,724 | 1/1981 | Beck . |
| 4,263,991 | 4/1981 | Morgan et al. . |
| 4,279,330 | 7/1981 | Pottorff et al. . |
| 4,425,993 | 1/1984 | Schilling . |
| 4,470,487 | 9/1984 | Blatt . |
| 4,609,076 | 9/1986 | Collins et al. . |
| 4,645,039 | 2/1987 | Lewis et al. ................... 188/170 X |

Primary Examiner—Douglas C. Butler
Attorney, Agent, or Firm—Peterson, Wicks, Nemer & Kamrath

[57] ABSTRACT

A brake is disclosed for the end of a shaft such as a motor shaft including a bowl-shaped housing secured to a bowl-shaped cylinder and sandwiching a pressure plate therebetween. A torque plate is reciprocally mounted and rotatably related to the housing by dowel pins which are reciprocally received in sleeve bearings and is biased by springs sandwiched between the torque plate and the housing and retained on spring pins. The torque plate includes circumferentially spaced integral lugs which extend through openings formed in the pressure plate and abut with a push plate of a reciprocal piston. A drive disc which is rotatably related but axially movable relative to the shaft to be braked is located radially inwardly of the lugs and is sandwiched between the torque plate and the pressure plate. The piston is also bowl-shaped and includes a circular plate terminating in an axially extending flange which is reciprocally received in an axially extending flange of the cylinder to define a pressure chamber. The housing and cylinder are closed to seal the internal components of the brake to allow ease of cleaning and to allow its use in food environments and in gas environments.

20 Claims, 1 Drawing Sheet

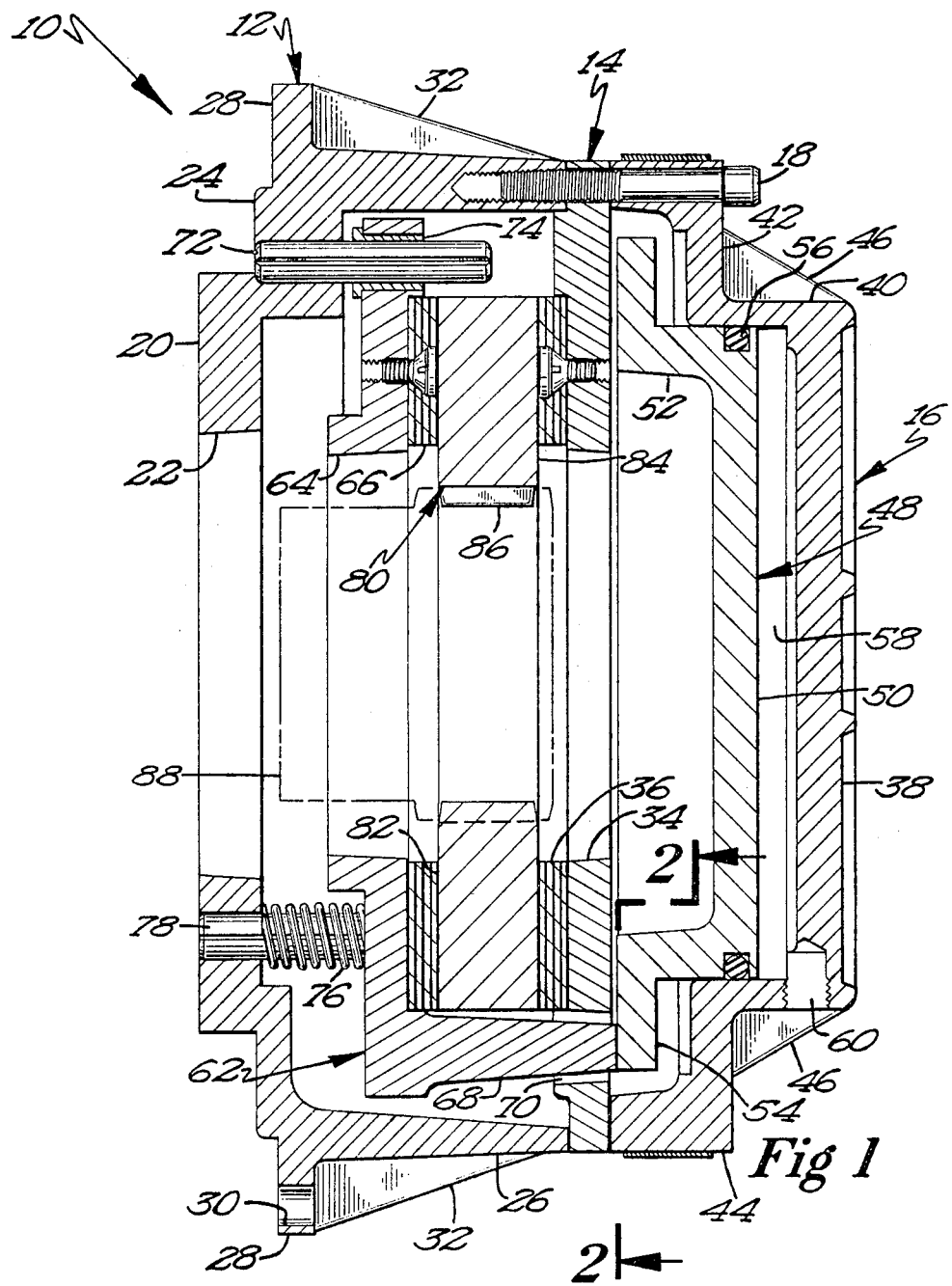
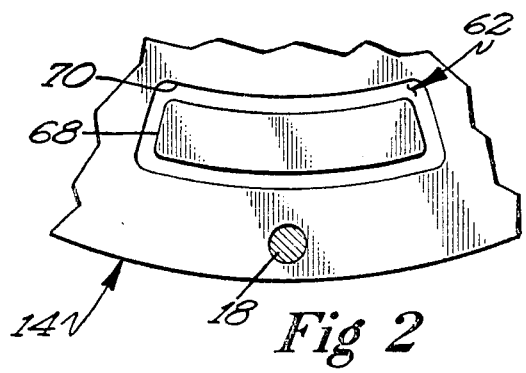

BRAKE

BACKGROUND

The present invention generally relates to brakes, and specifically to brakes for braking one of the shaft ends of a double shaft ended electric motor.

Existing motor brakes generally fall into two categories: electrical dry and air wet. Electrical dry motor brakes are disadvantageous because the characteristics of the coil changes with temperature and the coils often burn out. Thus, electrical dry brakes have relatively low reliability. Air wet motor brakes are disadvantageous because of their complexity and high cost and due to the possibility of leakage especially when utilized in food environments.

Thus a need has arisen for a motor brake which obtains the reliability of air wet brakes and the simplicity, cleanliness, and low cost of electrical dry brakes and which eliminates the disadvantages of both types.

SUMMARY

The present invention solves this need and other problems in the field of motor brakes by providing, in the most preferred form, a torque plate including integral lugs which are located radially outwardly of a drive disc for abutment with a piston which is located on the opposite side of the drive disc than the torque plate. The torque plate is reciprocally mounted and rotatably related to the housing in the most preferred form by dowel pins extending axially from the housing and which are reciprocally received in sleeve bearings formed in the torque plate. The torque plate is biased towards the drive disc and piston in the most preferred form by springs retained on pins extending axially from the housing and sandwiched between the torque plate and the housing.

It is thus an object of the present invention to provide a novel brake.

It is further an object of the present invention to provide such a novel brake for the end of a shaft.

It is further an object of the present invention to provide such a novel brake which may be utilized on the shaft of an electric motor.

It is further an object of the present invention to provide such a novel brake which is reliable.

It is further an object of the present invention to provide such a novel brake having a simplicity of design.

It is further an object of the present invention to provide such a novel brake allowing cleanliness.

It is further an object of the present invention to provide such a novel brake which does not contaminate its environment.

It is further an object of the present invention to provide such a novel brake which is not contaminated by its environment.

It is further an object of the present invention to provide such a novel brake which retards explosions.

It is further an object of the present invention to provide such a novel brake which is of low cost.

It is further an object of the present invention to provide such a novel brake which may be simply manufactured and assembled.

It is further an object of the present invention to provide such a novel brake which lends itself to casting.

It is further an object of the present invention to provide such a novel brake which is spring set.

It is further an object of the present invention to provide such a novel brake which is self contained.

It is further an object of the present invention to provide such a novel brake which is axially compact.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a cross sectional view of a brake according to the preferred teachings of the present invention.

FIG. 2 shows a partial, cross sectional view of the brake of FIG. 1 according to section line 2—2 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "radially", "axially", "inner", "outer", "central", "inwardly", "outwardly", and similar terms are used herein, it should be understood that these terms have reference only to the structure shown in the drawings as it would appear to a person viewing the drawings and are utilized only to facilitate describing the invention.

DESCRIPTION

A brake for securement to the shaft end of an electric motor according to the preferred teachings of the present invention is shown in the drawings and is generally designated 10. Brake 10 generally includes a housing 12, a pressure plate 14, and a cylinder 16 secured together by cap screws 18. Housing 12 in its most preferred form is generally bowl-shaped. Specifically, housing 12 includes a radial, annular plate 20 having a central opening 22 and terminating in a stepped, radially outwardly extending annular flange 24 in turn terminating in an axially outwardly extending annular flange 26. Housing 12 in the preferred form includes a radially extending annular mounting ear 28 extending from the interconnection of flanges 24 and 26 and having mounting apertures 30 formed therein for receiving bolts for anchoring housing 12 to an electric motor in the preferred form. In this regard, an adaptor ring may be utilized secured to the motor and to which in turn housing 12 is secured by bolts extending through apertures 30 and threadably received in the adaptor ring. Integral ribs 32 extend between flange 26 and ear 28 for reinforcement and cooling.

Pressure plate 14 is annularly shaped including a central opening 34 and having an outer diameter generally equal to and complementary to the outer diameter of flange 26 of housing 12 such that pressure plate 14 abuts with the free annular edge of flange 26. An annular friction facing 36 is secured on the axially inner face of pressure plate 14.

Cylinder 16 is generally bowl-shaped and includes a radial, circular plate 38 terminating in an axially inwardly extending annular flange 40 in turn terminating in a radially outwardly extending annular flange 42 in turn terminating in an axially inwardly extending annular flange 44. Integral ribs 46 extend between flanges 40 and 42 for reinforcement and cooling. Integral air cooling fins such as shown may be provided on plate 38. The radial size and shape of flange 44 is generally equal to and complementary to flange 26. Screws 18 extend through apertures formed in flange 44 and pressure plate 14 and are threaded in apertures formed in flange 26 to thus sandwich pressure plate 14 between housing 12 and cylinder 16.

Brake 10 according to the teachings of the present invention further includes a piston 48 slideably received in cylinder 16. Piston 48 in its preferred form is bowl-shaped and includes a circular plate 50 terminating in an axially inwardly extending annular flange 52 in turn terminating in a radially outwardly extending annular push plate 54. Flange 52 has a size complementary to and for reciprocal receipt in flange 40. Suitable sealing means 56 such as an O-ring as shown may be provided between flanges 40 and 52 to define a pressure chamber 58 by and between plates 38 and 50 and flange 40. Suitable provisions 60 may be provided for providing fluid communication through cylinder 16 to pressure chamber 58.

Brake 10 according to the teachings of the present invention further includes a movable, annular torque plate 62 including a central opening 64. A friction facing 66 is secured to the axially outer face of torque plate 62. Integral lugs 68 extend axially outwardly from the axially outer face of torque plate 62 radially outwardly of friction facing 66. Lugs 68 have a generally arcuate cross section and are circumferentially spaced and balanced around plate 62, with three lugs 68 being provided in the most preferred form. Lugs 68 extend through axially extending openings 70 formed in pressure plate 14 radially outwardly of friction facing 36 and of a size greater than lugs 68, with the free ends of lugs 68 abutting with push plate 54 of piston 48. To rotatably relate torque plate 62 to housing 12 and pressure plate 14, axially extending dowel pins 72 are anchored to flange 24 and are reciprocally received in sleeve bearings 74 received in torque plate 62 radially outwardly of friction facing 66 and circumferentially spaced from lugs 68. For biasing torque plate 62 toward pressure plate 14 and thus biasing piston 48 into cylinder 16 due to its abutment with piston 48, coil springs 76 are provided between plates 20 and 62 and in the preferred form are received on axially extending spring pins 78 anchored to plate 20.

Brake 10 according to the teachings of the present invention further includes a drive disc 80 having opposed interface surfaces 82 and 84. Drive disc 80 includes suitable provisions 86 such as a splined central opening for rotatably relating and allowing axial movement relative to a splined hub 88 rotatably fixed on a shaft to be braked.

In operation, and in the absence of fluid pressure to pressure chamber 58, springs 76 bias torque plate 62 towards pressure plate 14 to sandwich drive disc 80 therebetween and with lugs 68 pushing piston 48 into cylinder 16. Thus, friction facing 36 interfaces with surface 84 and friction facing 66 interfaces with surface 82 to brake drive disc 80 to thus stop any shaft rotatably connected thereto. When fluid pressure is introduced through provisions 60 into pressure chamber 58, piston 48 moves against the bias of springs 76 and pushes torque plate 62 through plate 54 and lugs 68 away from pressure plate 14 to thus rotatably separate friction facings 36 and 66 from drive disc 80. Thus, with fluid pressure in pressure chamber 58, drive disc 80 and any shaft rotatably connected thereto is free to rotate relative to housing 12 and pressure plate 14.

Now that the basic construction and operation of brake 10 according to the teachings of the present invention have been explained, advantages and subtle features of the present invention can be set forth and appreciated. In its most preferred form according to the teachings of the present invention, brake 10 is closed and may be sealed by mating with a similarly sealed electric motor. Thus, brake 10 is explosion retardant and has particular application to gas environments as gas can not get into the mating motor and brake 10 and be ignited by sparks caused by the interfacing of friction facings 36 and 66 and drive disc 80. Similarly, brake 10 has particular application to the food industry where it is desired to spray down the equipment for cleaning and where it is highly undesirable to expose grease or worn friction facing particles to the food or for food particles to contaminate the brake components.

It can then be appreciated that due to the closed nature of brake 10, outside air flow cooling is not permitted around the internal components. In the most preferred form, drive disc 80 has a greatly increased thickness, and specifically a multiple of thickness of pressure plate 14 and torque plate 62 and of prior drive discs. Thus, drive disc 80 according to the teachings of the present invention is conduction cooled to the housing and radiated outwardly.

It can be appreciated that brake 10 according to the teachings of the present invention is spring engaged and thus has fail safe characteristics. Specifically, in the event of power loss resulting in failure of air pressure, brake 10 will stop continued free rotation of the shaft to which it is rotationally connected. Further due to the spring engagement, braking forces are applied immediately with the venting of fluid pressure and at a constant rate and is not dependent on pressure build-up as in fluid engaged brakes.

It can be appreciated that drive disc 80 is not secured inside of housing 12 and pressure plate 14 or to torque plate 62 but rather floats therein by its support on splined hub 88 attached to the shaft to be braked. Thus brake 10 according to the teachings of the present invention does not contain any bearings for alignment. Further, alignment of housing 12 and pressure plate 14 to the shaft to be braked is not as critical due to the tolerance play of the splines interconnection between drive disc 80 and splined hub 88.

It can be further appreciated that brake 10 according to the teachings of the present invention is very axially compact. Specifically, a pancake type of pressure chamber 58 is utilized which has a large piston fluid contact area while requiring minimal axial space. Further, only a single O-ring is utilized to seal pressure chamber 58. Furthermore, as drive disc 80 is free floating, no bearings are required which would add to the axial length of the brake. Similarly, due to the generally plate construction of pressure plate 14, torque plate 62, drive disc 80, and plate 20 and flange 24, with flange 26 having an axial length only slightly longer than the combined axial length of torque plate 62 and drive disc 80, the axial length of brake 10 according to the teachings of the present invention is minimized and reduced over prior brakes.

Further, brake 10 according to the teachings of the present invention reciprocally mounts torque plate 62 by dowel pins 72. Thus, it is not necessary to reciprocally mount lugs 68 in openings 70. Manufacturing tolerances for assembling and forming dowel pins 72 and sleeve bearings 74 are faster and less costly for brake 10 according to the teachings of the present invention than in prior brakes. Further, lugs 68 may be integrally cast in torque plate 62.

Additionally, as springs 76 are interiorly located, dangers of accidentally releasing set force type springs during field repair may be minimized according to the teachings of the present invention. Specifically, screws 18 may include elongated threads to allow springs 76 to expand before pressure plate 14 and cylinder 16 are released from housing 12. Additionally, the other components of brake 10 act as a shield in preventing springs 76 from flying into space when cylinder 16 and piston 48 are removed.

Similarly, it can be appreciated that brake 10 according to the teachings of the present invention can be easily and rapidly assembled by placing plate 20 of housing 12 on a flat surface with flange 26 extending upwardly. The remaining components may be easily stacked on housing 12 and connected as a unit by screws 18.

Now that the basic teachings of the present invention have been explained, many extensions and variations will be obvious to one having ordinary skill in the art. For example, provisions for manually releasing brake 10 may be provided for in the event of loss of fluid pressure which would then prevent shaft rotation. In one form, screws could be provided in flanges 42 of cylinder 16 to push against push plate 54 of piston 48 for pushing piston 48 out of cylinder 16.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregong description, and all changes which come within the meaning and range of equivalency of the claims are intended to be embraced therein.

What is claimed is:

1. Brake for the end of a shaft such as the shaft of an electric motor comprising, in combination: a generally bowl-shaped housing including a radially extending annular flange terminating in an axially extending annular flange; a torque plate; means extending between the radially extending annular flange and the torque plate for reciprocally mounting and rotatably relating the torque plate relative to the housing; a drive disc rotatably related to the shaft; means located on the opposite side of the drive disc than the torque plate and secured to the axially extending annular flange of the housing for moving the torque plate away from the drive disc, with the means for moving the torque plate away from the drive disc including an axially movable piston, and lugs integrally formed on the torque plate for abutting with the piston, with the lugs extending from the torque plate located radially outwardly of the drive disc; and means for moving the torque plate towards the drive disc.

2. The brake of claim 1 wherein the reciprocally mounting and rotatably relating means comprises, in combination: dowel pins extending axially from the radially extending annular flange of the housing; and sleeve bearings secured in the torque plate for reciprocally receipt on the dowel pins.

3. The brake of claim 2 wherein the means for moving the torque plate towards the drive disc comprises means for biasing the torque plate towards the drive disc.

4. The brake of claim 3 wherein the biasing means comprises, in combination: pins extending axially from the housing; and springs retained on the pins and sandwiched between the torque plate and the housing.

5. The brake of claim 4 further comprising, in combination: a pressure plate secured to the axially extending flange and located intermediate the drive disc and the means for moving the torque plate away from the drive disc; means for rotatably relating and allowing axial movement of the drive disc relative to the shaft, with the drive disc being sandwiched between the torque plate and the pressure plate, with the lugs being circumferentially spaced and extending through complementary openings formed in the pressure plate.

6. The brake of claim 5 wherein the means for moving the torque plate away from the drive disc further includes a bowl-shaped cylinder having a circular plate terminating in an axially extending annular flange, with the axially extending flange of the cylinder being secured to the axially extending annular flange of the housing with the pressure plate sandwiched therebetween.

7. The brake of claim 6 wherein the axially extending annular flanges of the housing and of the cylinder and the circular plate are solid to create a sealed environment.

8. The brake of claim 7 wherein the drive disc has a thickness which is a multiple of the thickness of the torque plate and of the pressure plate to allow cooling by conduction.

9. The brake of claim 6 wherein the piston is bowl-shaped including a circular disc terminating in an axially extending annular flange having a shape and size for reciprocal receipt within the axially extending annular flange of the cylinder to define a pressure chamber between the circular plates of the piston and of the cylinder; wherein the means for moving the torque plate away from the drive disc further includes means for providing fluid pressure to the pressure chamber.

10. The brake of claim 9 wherein the axially extending flange of the piston terminates in a radially extending annular push plate, with the lugs of the torque plate abutting with the push plate of the piston.

11. The brake of claim 1 wherein the means for moving the torque plate towards the drive disc comprises, in combination: pins extending axially from the housing; and springs retained on the pins and sandwiched between the torque plate and the housing.

12. Brake for a shaft such as the shaft of an electric motor comprising, in combination: a generally bowl-shaped housing including a radially extending annular flange terminating in an axially extending annular flange; a torque plate; means extending between the radially extending annular flange and the torque plate for reciprocally mounting and rotatably relating the torque plate relative to the housing; a drive disc; means located on the opposite side of the drive disc than the torque plate and secured to the axially extending annular flange of the housing for moving the torque plate away from the drive disc; a pressure plate secured to the axially extending flange and located intermediate the drive disc and the means for moving the torque plate away from the drive disc; means for rotatably relating and allowing axial movement of the drive disc relative to the shaft, with the drive disc being sandwiched between the torque plate and the pressure plate, with the means for moving the torque plate away from the drive disc including an axially movable piston, and lugs extending between the torque plate and the piston and located radially outwardly of the drive disc and circumferentially spaced and extending through complementary openings formed in the pressure plate; and means for moving the torque plate towards the drive disc.

13. The brake of claim 12 wherein the means for moving the torque plate away from the drive disc further includes a bowl-shaped cylinder having a circular plate terminating in an axially extending annular flange, with the axially extending flange of the cylinder being secured to the axially extending annular flange of the housing with the pressure plate sandwiched therebetween.

14. The brake of claim 13 wherein the piston is bowl shaped including a circular disc terminating in an axially extending annular flange having a shape and size for reciprocal receipt within the axially extending annular flange of the cylinder to define a pressure chamber between the circular plates of the piston and of the cylinder; wherein the means for moving the torque plate away from the drive disc further includes means for providing fluid pressure to the pressure chamber.

15. The brake of claim 12 wherein the means for moving the torque plate towards the drive disc comprises means for biasing the torque plate towards the drive disc.

16. The brake of claim 15 wherein the biasing means comprises, in combination: pins extending axially from the housing; and springs retained on the pins and sandwiched between the torque plate and the housing.

17. Brake for the end of a shaft such as the shaft of an electric motor comprising, in combination: a generally bowl-shaped housing including a radially extending annular flange terminating in an axially extending annular flange; a torque plate; means extending between the radially extending annular flange and the torque plate for reciprocally mounting and rotatably relating the torque plate relative to the housing; a drive disc rotatably related to the shaft; a bowl-shaped cylinder having a circular plate terminating in an axially extending annular flange, with the axially extending flange of the cylinder being secured to the axially extending annular flange of the housing, with the cylinder located on the opposite side of the drive disc than the torque plate; a piston axially moveable within the cylinder; lugs extending between the torque plate and the piston and located radially outwardly of the drive disc for moving the torque plate away from the drive disc; and means for moving the torque plate towards the drive disc.

18. The brake of claim 17 wherein the piston is bowl-shaped including a circular disc terminating in an axially extending annular flange having a shape and size for reciprocal receipt within the axially extending annular flange of the cylinder to define a pressure chamber between the circular plates of the piston and of the cylinder; wherein the brake further comprises, in combination: means for providing fluid pressure to the pressure chamber for axially moving the piston within the cylinder.

19. The brake of claim 18 wherein the axially extending flange of the piston terminates in a radially extending annular push plate, with the lugs being integrally formed on the torque plate and abutting with the push plate of the piston.

20. The brake of claim 19 further comprising, in combination: a pressure plate secured to the axially extending flange of the housing and located intermediate the drive disc and the cylinder; means for rotatably relating and allowing axial movement of the drive disc relative to the shaft, with the drive disc being sandwiched between the torque plate and the pressure plate, with the lugs being circumferentially spaced and extending through complementary openings formed in the pressure plate.

* * * * *